(12) United States Patent
Natanzon et al.

(10) Patent No.: US 10,642,511 B2
(45) Date of Patent: May 5, 2020

(54) CONTINUOUS DATA PROTECTION STORAGE MEDIA USING SMART SOLID STATE DRIVES

(71) Applicant: EMC IP Holding Company LLC, Hopkinton, MA (US)

(72) Inventors: Assaf Natanzon, Tel Aviv (IL); Udi Shemer, Kfar Saba (IL); Kfir Wolfson, Beer Sheva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 34 days.

(21) Appl. No.: 16/153,536

(22) Filed: Oct. 5, 2018

(65) Prior Publication Data
US 2020/0110546 A1    Apr. 9, 2020

(51) Int. Cl.
*G06F 3/06*    (2006.01)
*G06F 11/14*    (2006.01)

(52) U.S. Cl.
CPC ............ *G06F 3/0619* (2013.01); *G06F 3/065* (2013.01); *G06F 3/0688* (2013.01); *G06F 11/1448* (2013.01); *G06F 11/1471* (2013.01); *G06F 2201/835* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 8,543,609 B1* | 9/2013 | Natanzon | G06F 3/0605 707/791 |
| 2008/0040402 A1* | 2/2008 | Judd | G06F 11/2066 |
| 2009/0109823 A1* | 4/2009 | Joukov | G06F 11/1451 369/85 |
| 2010/0280999 A1* | 11/2010 | Atluri | G06F 11/1471 707/657 |
| 2017/0185335 A1* | 6/2017 | Pardoe | G06F 1/30 |

* cited by examiner

*Primary Examiner* — Tracy C. Chan
(74) *Attorney, Agent, or Firm* — Staniford Tomita LLP

(57) ABSTRACT

Embodiments for providing continuous data protection in a data processing and storage system with a storage server and storage devices, by providing a solid state disk (SSD) device having a processor and non-volatile memory and an interface to a host device, providing a resident continuous data protection program on the SSD and executed by the processor, recording, for each write command, a memory address offset and a timestamp for the write command, and maintaining one of: an undo journal storing data in a location that is to be overwritten by the write command with the timestamp, or a log-structured file exposing a single large file as a volume to an upper layer of a host software stack for storing periodic snapshot backups of data created by the write command.

20 Claims, 4 Drawing Sheets

CONTINUOUS DATA PROTECTION STORAGE MEDIA USING SMART SOLID STATE DRIVES

TECHNICAL FIELD

Embodiments are generally directed to large-scale data storage systems and more specifically, to using smart solid state drive (SSD) devices for continuous data protection.

BACKGROUND

Large-scale data storage networks rely on continuous data protection (CDP) to automatically save a copy of every change made to the data. This allows the network to capture every version of the data that the user saves, thus providing the ability to restore data to any point in time in the event of hardware failure, system outages, and other significant disruptive events. CDP runs as a service that captures changes to data to a separate storage location and can provide fine granularities of restorable data objects (e.g., files, documents, directories, etc.).

Traditional recovery and restore methods in current data storage systems only restore data from the time a backup was made, whereas CDP uses no backup schedules and eliminates the need to specify the point in time to recover from until ready to restore. When data is written to disk, it is also asynchronously written to a second storage location. Though this eliminates the need for scheduled backups, it does introduce some overhead to disk write operations. Continuous data protection also requires high storage bandwidth. There are several ways to implement CDP, such as creating a journal and moving the old data to an undo log on every write, or creating a log structure of the data and managing the meta data. These methods require more bandwidth to the storage drives and more data movement compared to standard writes. CDP also increases CPU utilization. Managing the metadata for the any point in time data structures and moving large amounts of data requires significant amount of processing (CPU) overhead. A single storage array managing hundreds of drives will typically require significant amounts of CPU bandwidth for performing continuous data protection.

What is needed, therefore, is a data storage method that allows for use of advanced memory devices to improve storage media performance in large-scale data processing systems.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Networker, Data Domain, and Data Domain Restorer are trademarks of Dell EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
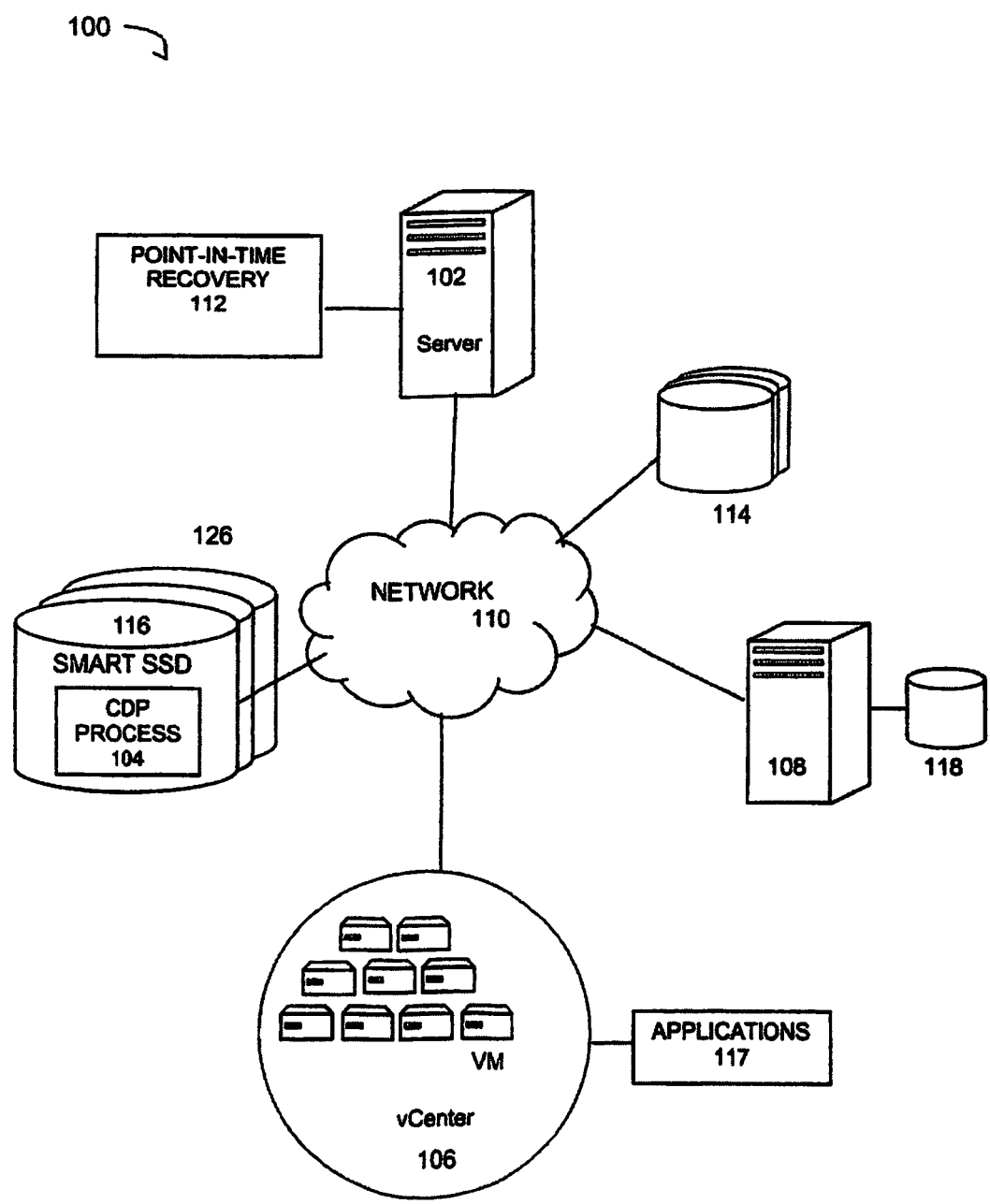
FIG. 1 is a diagram of a large-scale network implementing a continuous data protection process using smart solid state drives, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated data storage techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 is a diagram of a large-scale network implementing a continuous data protection process using smart solid state drives, under some embodiments. As shown in FIG. 1, a network server computer 102 is coupled directly or indirectly to primary and secondary storage devices, such RAID storage 114 or virtual machines (VMs) 106, and to the data source 108 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud-computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

In system 100, virtual machines may be organized into one or more vCenters (virtual centers) 106 representing a physical or virtual network of many virtual machines (VMs), such as on the order of thousands of VMs each. Such VMs may be primary VMs which run applications 117 and may utilize one or more data sources, such as computer 108, which may have attached local storage 118 or utilize networked accessed storage devices 114. The data sourced by the data source may be any appropriate data, such as database data that is part of a database management system. In this case, the data may reside on one or more hard drives (118 and/or 114) and may be stored in the database in a variety of formats. One example is an Extensible Markup Language (XML) database, which is a data persistence software system that allows data to be stored in XML format. Another example is a relational database management system (RDMS) which uses tables to store the information. Computer 108 may represent a database server that instantiates a program that interacts with the database. Each instance of a database server may, among other features, independently query the database and store information in the database, or it may be an application server that provides user interfaces to database servers, such as through web-based interface applications or through virtual database server or a virtual directory server applications.

The data generated or sourced by system 100 may be stored in any number of persistent storage locations and devices, such as local client storage, server storage (e.g., 118), or network storage (e.g., 114), which may at least be partially implemented through storage device arrays, such as RAID (redundant array of independent disks) components. In an embodiment network 100 may be implemented to provide support for various storage architectures such as storage area network (SAN), network-attached storage (NAS), or direct-attached storage (DAS) that make use of large-scale network accessible storage devices 114, such as large capacity disk (optical or magnetic) arrays. In an embodiment, the target storage devices, such as disk array 114 may represent any practical storage device or set of devices, such as fiber-channel (FC) storage area network devices, and OST (OpenStorage) devices. In a preferred embodiment, the data source storage is provided through VM or physical storage devices, and the target storage devices represent disk-based targets implemented through virtual machine technology.

For the embodiment of FIG. 1, network system 100 represents a data processing and data storage system that includes a smart SSD devices 126 that serve as primary storage for the system. There may also be a management server 102 that executes a management process that can restore the SSDs to any previous point in time through a point-in-time recovery (PITR) or restore process 112. The PITR process 112 allows an administrator to restore or recover a set of data or a system setting from a particular point (time) in the past.

In an embodiment, system 100 utilizes snapshot backups as recovery points to create point-in-time copies of a replica of the data to be stored by the primary storage media, such as SSDs 126. The replica thus comprises a complete point-in-time copy of the data stored in the storage media of the systems and which may be organized as files, folders, directories, volumes, etc. for data sources or one more protected computers. A data protection process may be used to copy a full replica of selected data to an allocated replica volume on a storage server. The recovery points of each replica in a protection group are created according to a specified schedule or point-in-time mechanism to allow a user to access the recovery points to recover previous versions of files in the event of data loss or corruption.

In an embodiment, system 100 may represent part of a Data Domain Restorer (DDR)-based deduplication storage system, and server 102 may be implemented as a DDR Deduplication Storage server provided by EMC Corporation. However, other similar data storage systems are also possible. Although many different types of storage media may be provided (e.g., HDD, RAID, etc.), the primary storage media in system 100 is generally provided by SSD devices 126.

For the embodiment of FIG. 1, each SSD, such as SSD 116 in storage array 126 executes a continuous data protection component 104 that provides CDP capability for system 100. In accordance with standard CDP methods, CDP process 104 automatically saves a copy of every change made to data being backed up, thus capturing every version of the data that the user saves. It can be configured to save the data for various levels of granularity, such as byte-level or block-level differences, rather than file-level differences. For CDP, when data is written to a storage location, t is also written asynchronously to a second location over network 110. In present systems, CDP solutions reside either external to the storage (e.g., the EMC RecoverPoint system) or inside the storage processors (e.g., SRDF). Such solutions require large movements of data out of the physical drives and quite a lot of CPU usage in order to keep a journal or log of the write I/Os and allow any point in time access to the protected data.

In system 100, the CDP process 104 is provided as part of individual storage media 116, which is implemented as a smart solid state drive (SSD). In general, a solid state drive is a storage device that uses solid state circuit assemblies as memory to store data persistently, as opposed to electromechanical drives e.g., HDDs). In a smart SSD, each drive contains not only memory but also a CPU with compute power in a close vicinity to the data. For the embodiment of FIG. 1, is implemented CDP inside the storage drives (e.g., 126) to save bandwidth, power, time, and CPU overhead to provide a CDP solution that is much more cost effective than existing solutions. In an embodiment the smart SSD device is an SSD with compute abilities provided in the form of on-board or resident microprocessors (CPUs). One example processor is an ARM (advanced RISC machine) processor, though other similar processors are also possible.

Figure 2:
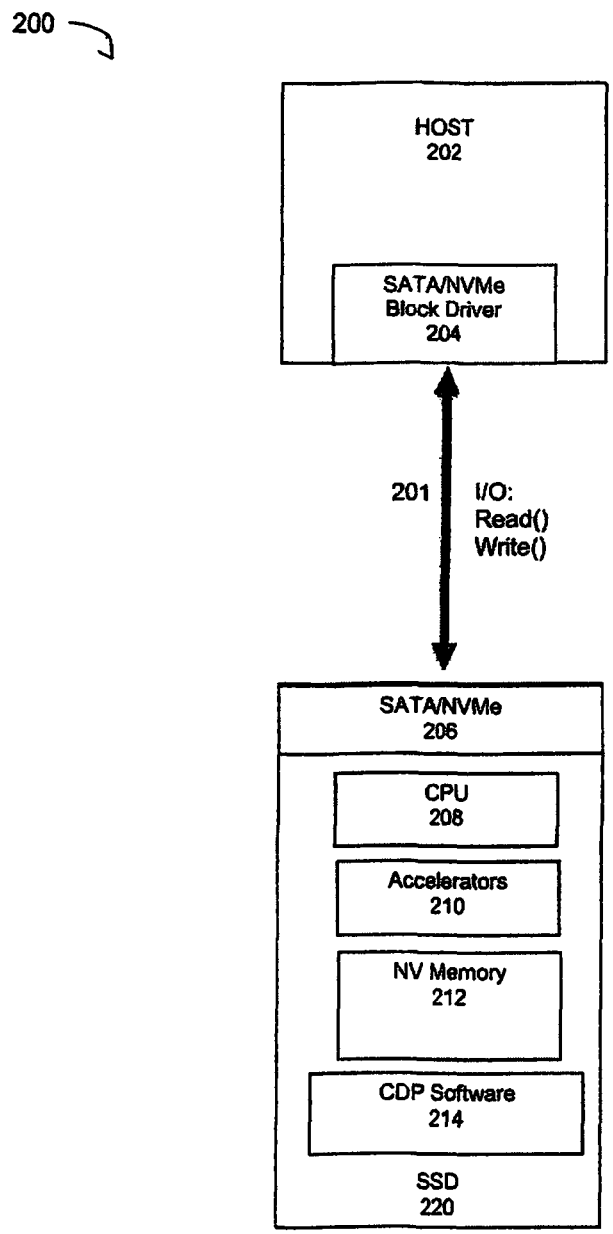
FIG. 2 illustrates a smart solid state drive device that can be used to implement a continuous data protection process, under some embodiments.

FIG. 2 illustrates a smart solid state drive device that can be used to implement a CDP process, under some embodiments. As shown in diagram 200, SSD 220 contains an on-board processor, CPU 208, which may be a single processor, a processor array, or a multi-core processor, such as a 16-core processor operating at 2 GHz per core, or any similar configuration. The SSD includes an amount (e.g., 16 to 32 GB) of NV memory 212, which may be implemented as NAND-based flash memory, which is a type of non-volatile memory that retains data during power off periods. Other on-board circuits may include compression or encryption hardware accelerators 210 and other buffers and processing circuits. In an embodiment, the SSD 220 communicates with a host computer 202 (e.g., administrative server 102) over a network link or bus 201. The SSD and host may communicate using any appropriate host controller interface 204/206 and storage protocol, such as SATA (Serial ATA), NVMe (non-volatile memory express), or any other interface that accelerates data transfers between hosts and storage over a PCIe (peripheral component interconnect express), or similar bus. The protocol between the host and the storage may also be implemented using a proprietary driver, which exposes a block device at the host an communicated directly with the smart SSD.

Although flash memory may be a preferred implementation for NV memory 212, other memory devices, such as battery-backed RAM may also be used. Similarly, SSD 220 may be a hybrid drive combining SSD and HDD storage for archival applications, or other types of NVMF drives.

In general, smart SSD drives allow processing of the data with much higher bandwidth than the bandwidth available between the CPU and a separate drive. Smart SSDs provide marked improvements in throughput, latency, and energy. Throughput is improved by providing increased bandwidth to flash chips and control over parallelism across flash channels; latency is improved since data requiring access to flash does not incur latency overheads to host memory and host software stack; and energy consumption is improved since smart SSDs avoid moving huge volumes of data to host memory and CPU for compute operations, thus reducing energy consumption.

In an embodiment, SSD 220 includes on-board software 214 for implementing a continuous data protection process. Creating storage that supports CDP generally requires extra read and write input/output operations (I/Os) to be performed for every I/O performed to the storage array. The management of the CDP data structures requires significant amount of CPU and thus with all the data movements and extra CPU cycles, so that in general, it is relatively difficult to produce an efficient primary CDP storage. Embodiments of smart SSD 220 overcome these challenges by providing a smart SSD with a CPU 208 that can support modified write commands. In an embodiment, for each write command, the CDP process 214 writes a memory offset and adds a timestamp which allow the data storage program (or PITR program 112) to roll the data back in time. The smart SSD exposes only a certain portion of its space for primary data, while the remaining portion will be used for the CDP data structures. The relative amount of each portion can be user configurable or defined by set system parameters, and any practical ratio can be used. For example, a typical implementation may devote 90% of the SSD space for primary data and the remaining 10% for CDP data structures, though other distributions are also possible, such as 80% to 20%, 75% to 25%, and so on.

There are two main ways to implement CDP using smart SSDs: using an undo journal to create any point in time, and using a log-structured file system. The CDP data structures include a journal in case of an undo journal implementation including the data, which allows exposing the device at a previous point in time, or the data of a file system snapshot in case the CDP volume is implemented over a log based file system.

In a first embodiment, an undo journal is used to create an any point in time snapshot backup. For each write command to the SSD will go directly to the SSD CPU, the CPU will read the data currently in the location which is about to be overwritten by the new write command, and will write it to an undo journal along with the timestamp of the new write command. This means for every external write the smart SSD will do an extra read and an extra write. This may increase the write amplification of the SSD drives, but it provides a very strong CDP feature.

In a second embodiment, the CDP process 104 leverages a log file system. In this embodiment, CDP process 104 installs a log structured file system on each drive to expose a single large file as a volume to the upper layer in the stack and periodically create a snapshot of the file. In this case, the user using the device sees a block device and is not necessarily aware that underneath this device is a file system, as the volume the user sees is actually a file inside this file system. An example of a log structured file system is ZFS, which is a combined file system and logical volume manager, originally developed by Sun Microsystems.

Figure 3:
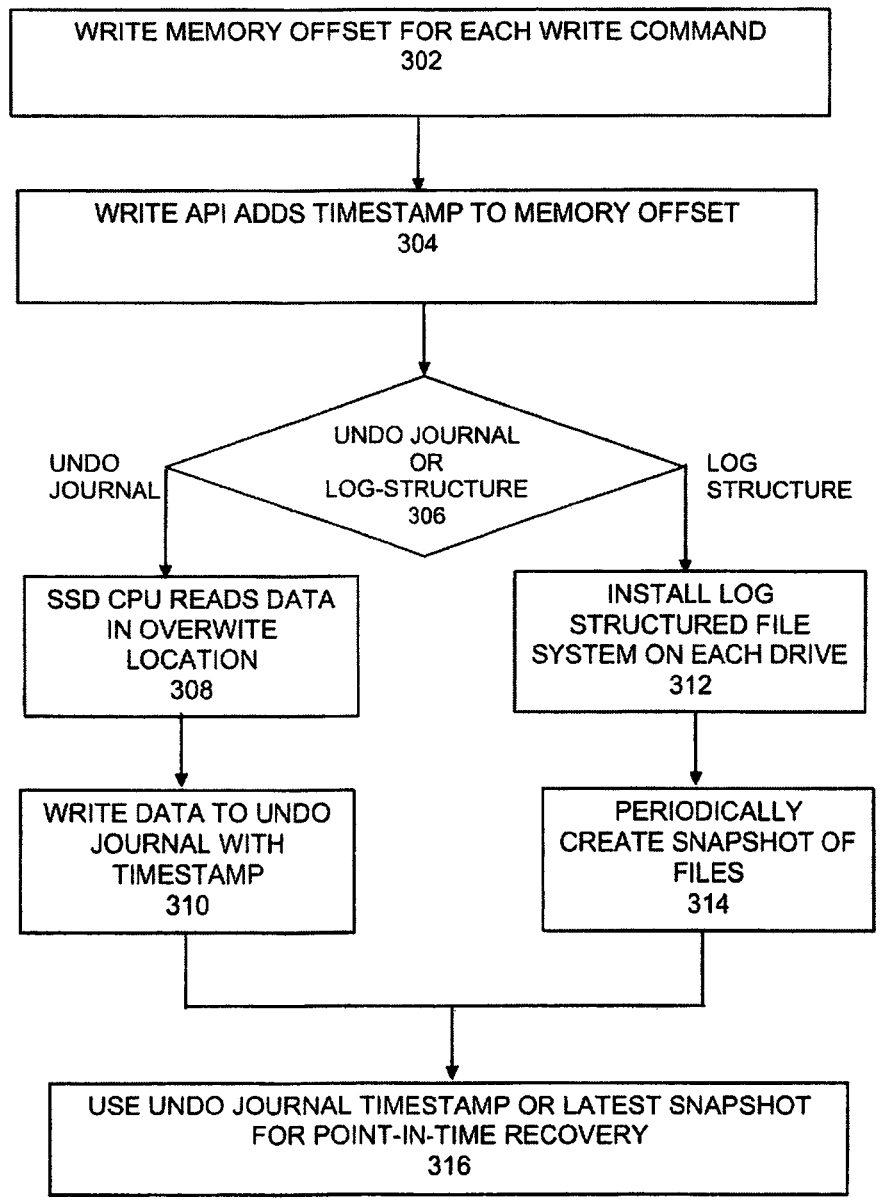
FIG. 3 is a flowchart that illustrates a method of implementing continuous data protection using a smart SSD device under some embodiments.

FIG. 3 is a flowchart that illustrates a method of implementing continuous data protection using a smart SSD under some embodiments. Process 300 begins with the CDP process 214 writing a memory offset for each write command, 302. A write API (application programming interface) also adds a timestamp to the memory offset, 304. The time stamp can be generated and added using processes as presently known, such as capturing a processor or on board clock time at a defined granularity (e.g., 1/10 second) coinciding with the write operation and encoding the time stamp as metadata. Since a single host may use several smart SSDs (as shown with array 126 in FIG. 1), if the user tries to roll back multiple SSDs to the same point in time there must be an order to the write operations. Thus, the host sending data to the SSD must indicate the current time stamp for each write so that when all SSDs attached to the host are moved to a point in time, it will be exactly the same point in time without the need to coordinate the SSDs. For this embodiment, the write API between the host and SSD includes a timestamp which is added as metadata to the write.

As described above, the CDP process can implement one or both of an undo journal or log-structured file to provide point-in-time data sets. If, in block 306, it is determined that the undo journal is used, the SSD CPU 208 reads the data currently in the location which is about to be overwritten by the new write command, 308. It then writes it to an undo journal along with the timestamp of the new write command, 310. If, in block 306, it is determined that the log-structured file method is used, the CDP process 104 installs a log structured file system on the SSD to expose a single large file as a volume to the upper layer in the stack, 312. It then periodically creates a snapshot of the file, 314. If memory space becomes full or otherwise constrained, snapshots can be deleted, typically starting with the earliest first, i.e., the oldest data from the undo stream is deleted. In block 316, the restore or recovery feature of the PITR program 112 can then use data set corresponding to the last or specific point-in-time as provided by the undo journal 310 or the snapshot backup 314.

Although FIG. 1 shows an example system having one SSD device 116, it should be noted that a typical large-scale (e.g., enterprise-scale) storage system will include a significant number of drives. For this multi-drive embodiment, the fact that the write API adds a timestamp for each write means that the restore process can restore all the drives to the same start time. With respect to the undo journal process, this means a system-wide image of the point-in-time can be obtained so that the data will be consistent across all the drives. If the log structure file system is used, the system will need to coordinate creating the snapshots at the correct point-in-time, which can be done by taking the snapshots based on a timestamp.

Along with the multi-drive CDP solution, a sub-drive CDP solution can also be realized. Since each SSD drive contains a CPU and software running on it, each drive can expose multiple volumes, where each volume manages its CDP separately. The system can then allocate a portion of the drive as a volume, which will allow the system to implements CDP on a per-application or a per-LUN (logical unit number) basis.

The smart SSD can also be leveraged to allow accessing multiple points-in-time in parallel, which will not interfere with each other. This feature is different based on the implementation of undo journal versus log-structured file. For an undo journal based implementation to get to a specific point in time, the system can either roll the journal back or create a virtual point-in-time access (e.g., using Recover-Point technology), which will build a virtual data structure which for each offset in the volume will either point to the volume data or to the undo log device. New writes will then be written to a new undo device. For the log-structured file system, the smart SSD will just expose a snapshot as a new device.

Embodiments herein described utilize smart SSD devices and leverage localized computing and data storage in order to implement continuous data protection inside the storage drives. An undo journal method or log-structure file system can be used to create any point-in-time access for multiple drive systems, implemented inside the storage while minimizing the extra load to the system that an external implementation will incur.

As described above, in an embodiment, system 100 include certain processes that may be implemented as a computer implemented software process, or as a hardware component, or both. As such, it may be an executable module executed by the one or more computers in the network, or it may be embodied as a hardware component or circuit provided in the system. The network environment of FIG. 1 may comprise any umber of individual client-server networks coupled over the Internet or similar large-scale network or portion thereof. Each node in the network(s) comprises a computing device capable of executing software code to perform the processing steps described herein.

Figure 4:
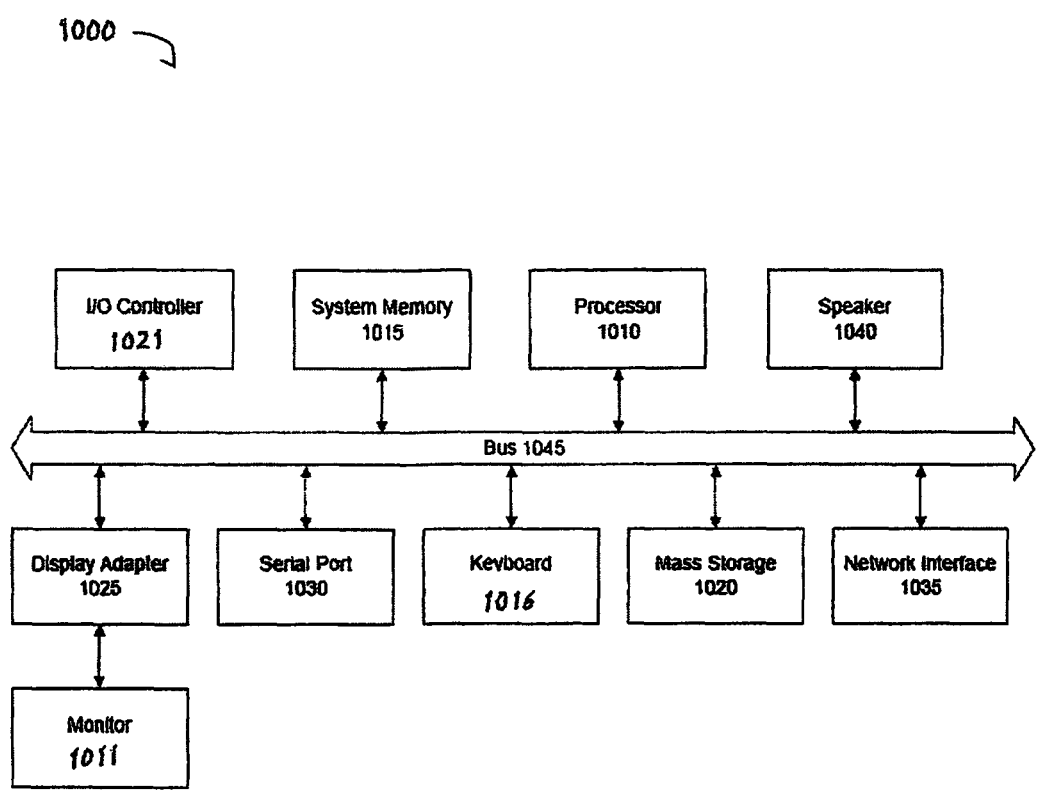
FIG. 4 is a block diagram of a computer system used to execute one or more software components of a system for continuous data protection using smart SSD devices, under some embodiments.

FIG. 4 is a block diagram of a computer system used to execute one or more software components of a system for continuous data protection using smart SSD devices, under some embodiments. The computer system 1000 includes a monitor 1011, keyboard 1016, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 4 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows® family of systems (e.g., Windows Server), Linux, Mac OS X, IRIX32, or IRIX64. Other operating systems may be used. Microsoft Windows is a trademark of Microsoft Corporation.

Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only, and embodiments are not so limited. Any appropriate alternative language or programming convention may be used by those of ordinary skill in the art to achieve the functionality described.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of providing continuous data protection in a data storage system, comprising:
   providing a solid state disk (SSD) device having a processor and non-volatile memory and an interface to a host device;
   providing a resident continuous data protection program on the SSD device and executed by the processor;
   recording, for each write command from the host device, a memory address offset and a timestamp for the write command; and
   maintaining one of: an undo journal storing data in a location that is to be overwritten by the write command with the timestamp for the write command, or a log-structured file exposing a single large file as a volume to an upper layer of a host software stack for storing periodic snapshot backups of data created by the write command.

2. The computer-implemented method of claim 1 further comprising using the data stored in the journal or snapshot backups as recovery points to create point-in-time copies of data stored in the SSD device.

3. The computer-implemented method of claim 2 wherein the point-in-time copies are processed by an administrative recovery program executed by a storage server computer of the system.

4. The computer-implemented method of claim 1 wherein the timestamp is written by a write API (application programming interface) process.

5. The computer-implemented method of claim 1 wherein the non-volatile memory comprises NAND-based flash memory, and the processor comprises a multi-core ARM microprocessor.

6. The computer-implemented method of claim 1 wherein the interface comprises a host controller interface and storage protocol selected from one of: SATA (Serial ATA) and NVMe (non-volatile memory express).

7. The computer-implemented method of claim 1 further comprising dedicating a first portion of the non-volatile memory for primary data, and a second portion of the non-volatile memory for CDR (continuous data protection) data structures.

8. The computer-implemented method of claim 4 wherein the system comprises a plurality of SSD drives, and wherein the write API adds a respective time stamp for each write operation to each SSD drive to allow a system-wide image of a point-in-time specified by a particular timestamp.

9. The computer-implemented method of claim 8 wherein each drive exposes a plurality of volumes, wherein each volume of the plurality of volumes manages its own respective CDP (continuous data protection) process to allow for continuous data protection on a per application basis.

10. The computer-implemented method of claim 1 further comprising: facilitating multiple point-in-time access by exposing, in the log-structured file a snapshot backup as a new device, or creating, in the undo journal, a virtual data structure pointing to a new undo log device.

11. A system providing continuous data protection in a data processing and storage system having a storage server and multiple storage devices, comprising: a solid state disk (SSD) device having a processor and non-volatile memory and an interface to a host device; an executable resident continuous data protection program on the SSD device and executed by the processor;
   a memory recording, for each write command from the host device, a memory address offset and a timestamp for the write command; and
   a component maintaining one of: an undo journal storing data in a location that is to be overwritten by the write command with the timestamp for the write command, or a log-structured file exposing a single large file as a volume to an upper layer of a host software stack for storing periodic snapshot backups of data created by the write command.

12. The system of claim 11 further comprising using the data stored in the journal or snapshot backups as recovery points to create point-in-time copies of a replica of the data stored on the SSD device, and wherein the replica comprises a complete point-in-time copy of the data organized as folders or files.

13. The system of claim 11 wherein the timestamp is written by a write API (application programming interface) process.

14. The system of claim 11 wherein the non-volatile memory comprises NAND-based flash memory, and the interface comprises a host controller interface and storage protocol selected from one of: SATA (Serial ATA) and NVMe (non-volatile memory express), and the processor comprises a multi-core ARM microprocessor.

15. The system of claim 11 further comprising dedicating a first portion of the non-volatile memory for primary data, and a second portion of the non-volatile memory for CDP (continuous data protection) data structures.

16. The system of claim 13 wherein the system comprises a plurality of SSD drives, and wherein the write API adds a respective time stamp for each write operation to each SSD drive to allow a system-wide image of a point-in-time specified by a particular timestamp.

17. The system of claim 16 wherein each drive exposes a plurality of volumes, wherein each volume of the plurality of volumes manages its own respective CDP (continuous data, protection) process to allow for continuous data protection on a per application basis.

18. The system of claim 11 further comprising: facilitating multiple point-in-time access by exposing, in the log-structured file a snapshot backup as a new device, or creating, in the undo journal, a virtual data structure pointing to a new undo log device.

19. The solid-state disk (SSD) device for providing continuous data protection in a data storage system having a storage server and multiple storage devices, comprising:
   a processor;
   non-volatile memory coupled to the memory;
   an interface coupling the SSD device to the storage server;
   a resident continuous data protection program resident on the SSD device and executed by the processor;
   a component recording, for each write command from the host device, a memory address offset and a timestamp for the write command and maintaining one of: an undo journal storing data in a location that is to be overwritten by the write command with the timestamp for the write command, or a log-structured file exposing a single large file as a volume to an upper layer of a host software stack for storing periodic snapshot backups of data created by the write command.

20. The SSD device of claim 19 wherein a point-in-time recovery process of the storage server uses the data stored in the journal or snapshot backups as recovery points to create point-in-time copies of a replica of the data to be stored in the SSD device, wherein the replica comprises a complete point-in-time copy of the data.

* * * * *